United States Patent [19]

Andra et al.

[11] Patent Number: 4,961,254

[45] Date of Patent: Oct. 9, 1990

[54] PROCESS FOR MANUFACTURING A TORSIONAL VIBRATION DAMPING DEVICE

[75] Inventors: Rainer H. Andra, Limburg; Günter Ullrich, Hemsbach, both of Fed. Rep. of Germany

[73] Assignee: Firma Carl Freudenberg, Weinheim/Bergstr, Fed. Rep. of Germany

[21] Appl. No.: 376,353

[22] Filed: Jul. 6, 1989

[30] Foreign Application Priority Data

Jul. 23, 1988 [DE] Fed. Rep. of Germany ....... 3825063

[51] Int. Cl.⁵ .............................................. B23P 13/00
[52] U.S. Cl. .................................... 29/173; 29/469.5; 74/574; 464/89
[58] Field of Search ................. 74/574; 29/173, 469.5; 464/89, 180

[56] References Cited

FOREIGN PATENT DOCUMENTS 152953 9/1983 Japan ..................................... 74/574
186635 12/1963 Sweden ................................ 464/89

Primary Examiner—P. W. Echols
Attorney, Agent, or Firm—Felfe & Lynch

[57] ABSTRACT

Process for manufacturing a torsional vibration damping device where a vulcanizable rubber mixture is placed in the interspace between a pot-like hub ring and an inertial ring. The hub ring is permanently expanded in radial direction following the vulcanization of the rubber mixture or the inertial ring is compressed towards the inside.

7 Claims, 1 Drawing Sheet

PROCESS FOR MANUFACTURING A TORSIONAL VIBRATION DAMPING DEVICE

BACKGROUND OF THE INVENTION

The invention relates to a process for manufacturing a torsional vibration damping device including a vulcanizable rubber mixture which is placed in the radial interspace between the surface of a pot-like configured hub ring having an axial portion and a radially extending annular ring, and an inertial ring. The rubber is hardened by means of vulcanization and connected to the rings.

Such a process is disclosed by German DE-OS 11 66 552, which process makes use of thermal vulcanization of the rubber mixture employed. However, a contraction tension is generated in the radial direction during the cooling phase which follows the process of vulcanization. A premature destruction of the rubber layer and a limited adaptability to particular applications results.

SUMMARY OF THE INVENTION

It is an object of the invention to further develop such a process so that the rubber layer supporting the inertial ring on the hub ring is mostly free of contraction tension caused by the vulcanization.

This object is achieved in accordance with the invention by radially expanding the axial portion and axially deforming the annular ring subsequent to vulcanization so that the distances between the respective radially and axially opposed surfaces of the hub ring and inertial ring are decreased.

Following the vulcanization of the rubber mixture, the axial portion of the hub ring is permanently expanded in the radial direction and/or the inertial ring is compressed in radial direction, i.e. calibrated, which is done in a very simple way by means of a press, and permits eliminating the contraction tension caused by vulcanization as much as possible. Further, it is also possible to execute, if necessary, the expanding and compressing to such an extent that an elastic compression is generated in the rubber ring produced by vulcanization. The adaptability of the torsional vibration damping device in accordance with the invention to special conditions of application is thus significantly improved.

Only hub rings which can be modified so as to have a permanent form following the vulcanization of the rubber ring can be employed for the working of the process. The use of sheet metal which can be deep-drawn, especially steel, proved to be particularly good.

DETAILED DESCRIPTION OF THE PREFERRED EMBODIMENTS

The original form which the hub rings 1 and the rubber layers 2 connecting the hub rings to the inertial rings 3 have prior to vulcanization is indicated by the respective dotted lines. Following the vulcanization and the cooling of the rubber rings 2, the form of the hub rings 1 and rubber rings 2 is modified as indicated by arrows such that it finally assumes the shape as outlined by the continuous lines. It is above all characterized in that the contraction tension created in the rubber rings 2 in the course of the cooling process following the thermal vulcanization is reduced as far as possible or replaced by compression. The service life of the finally created torsional vibration damping device is thus significantly improved.

Figure 1:
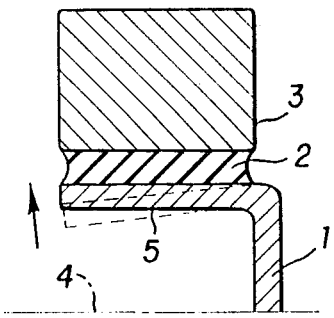
FIGS. 1 to 3 are representative embodiments of ready-for-use torsional vibration damping devices in a half cross section view.
Figure 2:
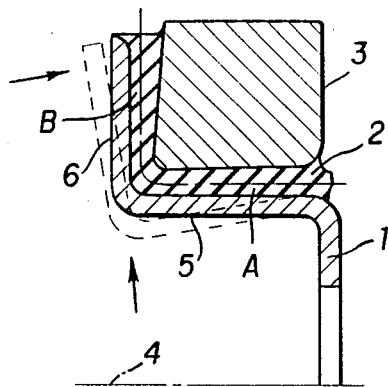
Figure 3:
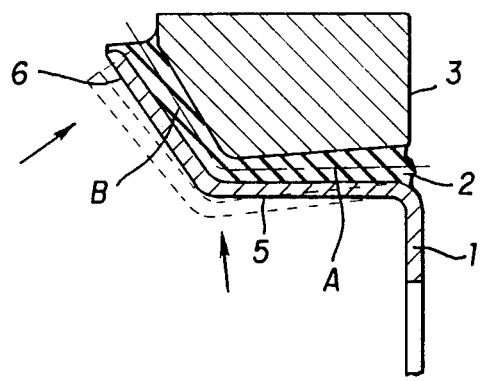

Referring to FIG. 2, hub ring 1 having an axis 4 is provided with an axial portion 5 having an annular ring 6 extending radially therefrom. The ring 6 and the axial portion 5 of the hub ring are held at the respective opposing partial surfaces of the inertial ring 3 by a continuous intermediate layer 2 made of rubber. The length of the axial portion which is bonded to the inertial ring is substantially the same as the length of the annular ring which is bonded to the inertial ring. In order to eliminate substantially all contraction tensions caused by the vulcanization of the intermediate layer 2, the invention determines that the axial portion 5 of the hub ring 1 is expanded wider in the area of the annular ring 6 than in the area of the opposite, axial end. As shown in FIG. 2 and 3, that end may not be expanded at all.

The reduction of the radial layer thickness in the area of the axial portion 5 of the hub ring, which is created in the course of manufacture, can thus be superimposed by approaching the axial portion 5 and the annular ring 6 in the respective radial and axial directions, which in both areas A and B serves to at least strongly reduce the contraction tensions created in the course of manufacture. Preferably, the radial expanding of the axial portion and the axial deforming of the annular ring are graduated into each other continuously. The finally resulting torsional vibration damping device consequently has a significantly prolonged service life.

Particularly good properties result in this respect if the areas of different expansion of the axial portion of the hub ring are configured so as to join each other uniformly, and if the hub ring has a profile wherein the axial portion 5 and the annular ring 6 are bonded to the inertial ring 3 along basically conforming lengths. Other embodiments of the profile of the inertial ring and the hub ring are also possible. They can include designs with the inertial ring having a rounded profile in the area opposing the hub ring, wherein the hub ring likewise has a rounded profile.

FIG. 3 shows an embodiment wherein the inertial ring 3 has a smaller interior diameter toward the annular ring 6 than it does away from the annular ring, i.e, adjacent the hub ring 1.

We claim:

1. Method for the production of a torsional vibration damper comprising a hub ring with an axial portion and an annular ring extending radially therefrom, an inertial ring located concentrically about said axial portion, and a continuously vulcanized rubber intermediate layer between said hub ring and said inertial ring, characterized in that subsequent to vulcanization the axial portion of the hub ring is expanded, said axial portion being expanded more toward said annular ring than it is away from said annular ring, thereby relieving contraction tension formed in the rubber layer during vulcanization.

2. Method according to claim 1 wherein the inertial ring has a smaller interior diameter toward the annular ring than it does away from the annular ring.

3. Method as in claim 1 wherein the distances between respective surfaces of the hub ring and the inertial ring are decreased by permanently radially expanding the axial portion and permanently axially deforming the annular ring.

4. Method as in claim 3 wherein the radial expanding of the axial portion and the axial deforming of the annular ring are graduated into each other continuously.

5. Method as in claim 1 wherein the length of the axial portion which is bonded to the inertial ring is substantially the same as the length of the annular ring which is bonded to the inertial ring.

6. Method as in claim 1 wherein the distance between the axial portion and the inertial ring is decreased by compressing the inertial ring in the radial direction.

7. Method as in claim 1 wherein the axial portion has an axial end opposite said annular ring, said axial end not being expanded.

* * * * *